United States Patent [19]

Ohsawa et al.

[11] Patent Number: 5,258,451
[45] Date of Patent: Nov. 2, 1993

[54] METHOD FOR THE PREPARATION OF AN AQUEOUS EMULSION OF ORGANOPOLYSILOXANE

[75] Inventors: Yoshihiko Ohsawa; Hiroshi Ohashi; Yoshio Okamura, all of Gunma, Japan

[73] Assignee: Shin-Etsu Chemical Co., Ltd., Tokyo, Japan

[21] Appl. No.: 710,871

[22] Filed: Jun. 6, 1991

[30] Foreign Application Priority Data

Jun. 7, 1990 [JP] Japan ................. 2-149339

[51] Int. Cl.$^5$ ................................. C08K 5/06
[52] U.S. Cl. ................... 524/755; 524/773; 524/837; 524/863; 524/864
[58] Field of Search ............... 524/755, 773, 837, 863, 524/864

[56] References Cited

U.S. PATENT DOCUMENTS

| | | | |
|---|---|---|---|
| 4,477,623 | 10/1984 | Pons et al. | 524/755 |
| 4,620,878 | 11/1986 | Gee | 106/287.15 |
| 4,677,178 | 6/1987 | Okada et al. | 524/837 |
| 4,814,376 | 3/1989 | Tanaka et al. | 524/837 |
| 4,935,464 | 6/1990 | Ona et al. | 524/837 |
| 4,999,398 | 11/1991 | Graiver et al. | 524/837 |

Primary Examiner—John C. Bleutge
Assistant Examiner—Karen A. Dean

[57] ABSTRACT

A highly stable emulsion of an organopolysiloxane suitable for use as a fabric-finishing agent is proposed which is prepared by mixing and agitating (a) an organopolysiloxane of a linear molecular structure having polyoxyalkylene groups and amino- or epoxy-substituted groups bonded to the silicon atoms, (b) a specified amount of a, preferably, non-ionic surface active agent having a specific HLB value and (c) water in an amount to form an oil-in-water type emulsion.

6 Claims, No Drawings

METHOD FOR THE PREPARATION OF AN AQUEOUS EMULSION OF ORGANOPOLYSILOXANE

BACKGROUND OF THE INVENTION

The present invention relates to a method for the preparation of an aqueous emulsion of an organopolysiloxane or, more particularly, to a method for the preparation of an aqueous, emulsion of an organopolysiloxane of the oil-in-water type suitable for use as a fabric-finishing agent having excellent stability with a very small average diameter of the organopolysiloxane droplets and capable of imparting excellent softness and very pleasant feeling of touch to the fabric material treated therewith.

It is a well-established technology in the fabric industry that fabric materials of various kinds of natural fibers as well as synthetic fibers are subjected to a treatment with a fabric-finishing agent in order to upgrade the quality of the product such as smoothness in touch, softness and the like. Among a variety of types of fabric-finishing agents heretofore used in the fabric industry, silicone-based fabric-finishing agents are widely used including those comprising a dimethylpolysiloxane as the principal ingredient, those comprising an amino-modified organopolysiloxane as the principal ingredient and the like. These silicone-based fabric-finishing agents are used usually as an aqueous emulsion of the oil-in-water type prepared by the emulsification of the organopolysiloxane utilizing a surface active agent as the emulsifying agent.

The process of fabric-finishing treatment by using such an emulsion-type fabric finishing agent is undertaken usually under very unfavorable conditions against stability of the emulsion. For example, an aqueous emulsion of silicone as prepared is usually diluted by 10 to 100 times with addition of water before application to fabric materials. Further, such a diluted aqueous emulsion of silicone is subjected to a strong mechanical shearing force such as agitation, pressurization by pumping, squeezing and the like, sometimes, at a high temperature or brought into contact with other chemical compounds which may have an adverse effect on the stability of the emulsion.

Once such an aqueous emulsion of silicone is destroyed under the above mentioned adverse conditions, the silicone constituent is separated from the aqueous medium and unevenly deposited on the surface of the fabric material treated with the fabric-finishing agent to cause serious troubles such as a seemingly uneven color of the fabric material dyed in the preceding or concurrent dyeing procedure and a phenomenon of so-called oil spots which means that the spotwise areas on which the silicone is heavily deposited are seemingly in a deeper color than the other areas due to the difference in the refractive index.

Accordingly, extensive studies have been undertaken in order to improve the stability of an aqueous emulsion of silicones. One of the measures to improve the stability of an aqueous emulsion is to decrease the diameter of the silicone droplets dispersed in the aqueous medium as far as possible and proposals along this line have been made hitherto for a so-called "microemulsion", which is a seemingly clear liquid but microscopically not a uniform solution, and a method for the preparation thereof.

For example, U.S. Pat. No. 4,146,499 teaches a method for obtaining a clear microemulsion of an organopolysiloxane in a four-step process by utilizing two kinds of surface active agents having different solubilities in the organopolysiloxane. Further, U.S. Pat. No. 3,975,294 and U.S. Pat. No. 4,052,331 propose a method for the emulsification of a silicone by utilizing a combination of a specific emulsifying agent, organic acid and amine compound. These prior art methods, however, are not without problems as a practical method because the preparation process thereof is very complicated or an extremely large amount of an emulsifying agent is required so that the excellent fabric-finishing characteristics inherent in silicones are lost so greatly as not to fully exhibit the effect of imparting softness to the finished fabric material.

Alternatively, Japanese Patent Kokai No. 60-127327 proposes a method for obtaining an aqueous emulsion of a silicone having a diameter of the silicone droplets not exceeding 0.3 $\mu$m by undertaking phase inversion in which an organopolysiloxane having polar groups is admixed with an emulsifying agent immiscible therewith and water to form a translucent oil concentrate which is then rapidly dispersed in water. This method, however, is defective because complicated process control is essential with utmost care in the control of the length of time and temperature in each step of the process if not to mention the insufficient fabric-finishing effect of the emulsion obtained by the method not to impart a good feeling of touch to the fabric material treated therewith.

Further alternatively, Japanese Patent Kokai No. 64-160 teaches a method in which a base emulsion of an organopolysiloxane having trifunctional siloxane units is gradually added dropwise to an aqueous solution containing a polymerization initiator for the emulsion polymerization and Japanese Patent Kokai No. 63-270875 proposes a method in which an aqueous emulsion of a carboxyl group-containing organopolysiloxane is neutralized. Neither of these methods, however, can impart the fabric material with a quite satisfactory feeling of touch.

Further, it is known that fabric materials can be imparted with a relatively satisfactory feeling of touch when the material is finished by using an aqueous emulsion obtained by the reaction of an organic acid added to an emulsion of an amino group-containing organopolysiloxane but such an emulsion is also not advantageous from the practical standpoint because the manufacturing process thereof is somewhat complicated involving a troublesome step of reaction.

SUMMARY OF THE INVENTION

The present invention accordingly has an object to provide, in view of the above described problems in the prior art, a convenient and simple method for the preparation of an aqueous microemulsion (emulsion) of an organopolysiloxane for fabric finishing having excellent stability and capable of imparting fabric materials with a greatly improved feeling of touch such as softness and smoothness. In particular, the object of the invention is to provide a method for the preparation of an aqueous emulsion of an oganopolysiloxane which is dispersed in the aqueous medium as extremely fine droplets having an average particle diameter not exceeding 0.3 $\mu$m.

Thus, the method of the present invention for the preparation of an aqueous emulsion of an organopolysiloxane in which the droplets of the organopolysiloxane have an average particle diameter not exceeding 0.3 μm comprises the steps of:

(A) mixing together (a) 100 parts by weight of an organopolysiloxane represented by the average unit formula $$Q_a R^1_b R^2_c SiO_{(4-a-b-c)/2}, \qquad (I)$$

in which Q is polyoxyalkylene group represented by the general formula $$-R^3-O-(C_xH_{2x}-O)_y-A, \qquad (II)$$

A being a hydrogen atom, an acyl group or a monovalent hydrocarbon group, $R^3$ being a divalent hydrocarbon group, the subscript x being 2, 3 or 4 and the subscript y being a positive integer of 3 to 100, $R^1$ is an unsubstituted or halogen-substituted monovalent hydrocarbon group having up to 20 carbon atoms or an alkoxy group having up to 20 carbon atoms, $R^2$ is a monovalent hydrocarbon group substituted with a substituent selected from the class consisting of an amino group, alkyl- or aminoalkyl-substituted amino group, amino group reaction with an epoxy compound or an organic or inorganic acid and hydrocarbon group having an epoxy group or a glycidyloxy group unreacted or reacted with an amine compound, the subscript a is a positive number in the range from 0.001 to 0.2, the subscript b is a positive number in the range from 1.6 to 2.0 and the subscript c is a positive number in the range from 0.001 to 0.2 with the proviso that the sum of a+b+c is in the range from 1.8 to 2.1, (b) from 5 to 100 parts by weight of a surface active agent, and (c) from 20 to 2000 parts by weight of water; and (B) agitating the mixture of the components (a), (b) and (c) to cause dispersion of the components (a) and (b) in the component (c).

DETAILED DESCRIPTION OF THE PREFERRED EMBODIMENTS

As is described above, the inventive method for the preparation of a very stable aqueous emulsion of an organopolysiloxane is characterized by the use of a specific organopolysiloxane as the component (a) in combination with a specific amount of a surface active agent as an emulsifying agent.

The organopolysiloxane as the principal ingredient of the aqueous emulsion prepared according to the inventive method is represented by the average unit formula (I) given above. In the formula, Q is a polyoxyalkylene group represented by the general formula (II) given above, in which the end-blocking group A is a hydrogen atom, an acyl group such as acetyl group or a monovalent hydrocarbon group or, preferably, an alkyl group such as methyl, ethyl, propyl and butyl groups, and $R^3$ is a divalent hydrocarbon group such as ethylene and propylene groups. The subscript x in the formula (II) for the group Q is 2, 3 or 4 or, preferably, 2 corresponding to the moiety of polyoxyethylene units or 2 and 3 in combination corresponding to the copolymeric moiety of polyoxyethylene and polyoxypropylene units and the subscript y is a positive integer of 3 to 100 or, preferably, 3 to 35. When the value of x is 5 or larger, the hydrophilicity of the organopolysiloxane is decreased so that difficulties are encountered in the microemulsification thereof. When the value of y is smaller than 3, no microemulsion of the organopolysiloxane can be obtained by merely agitating the mixture of the components or the droplets of the organopolysiloxane would have a coarser diameter than 0.3 μm. A value of y larger than 100 is undesirable because the microemulsion prepared from such an organopolysiloxane cannot impart the fabric material with full softness although microemulsions can be prepared even from such an organopolysiloxane without particular problems.

The group denoted by $R^1$ in the formula (I) is an unsubstituted or halogen-substituted monovalent hydrocarbon group or an alkoxy group having 1 to 20 carbon atoms. Examples of the group suitable as $R^1$ include: alkyl groups such as methyl, ethyl, propyl, butyl, hexyl, octyl, dodecyl and octadecyl groups; aryl groups such as phenyl and tolyl groups; alicyclic groups such as cyclopentyl and cyclohexyl groups; halogen-substituted hydrocarbon groups such as chloromethyl, chloropropyl, 3,3,3-trifluoropropyl and chlorophenyl groups; and alkoxy groups such as methoxy, ethoxy, propoxy and butoxy groups. It is preferable that all or at least a major portion of the groups denoted by $R^1$ are methyl groups.

The group denoted by $R^2$ in the formula (I) is a monovalent hydrocarbon group substituted by a substituent selected from the class consisting of an amino group, alkyl- or aminoalkyl-substituted amino group, amino group after reaction with an epoxy compound or an organic or inorganic acid and hydrocarbon group having an epoxy group or glycidyloxy group unreacted or reacted with an amine compound. The amino-substituted hydrocarbon group is exemplified by 3-aminopropyl and 4-aminobutyl groups. The alkyl-or aminoalkyl-substituted hydrocarbon group is exemplified by 3-(N-2-aminoethyl)propyl and 3-(dimethylamino)propyl groups. The amino groups in these amino-containing groups can be reacted with an epoxy compound, e.g., glycidyl alcohol, or an organic or inorganic acid, e.g., acetic and phosphoric acids. The hydrocarbon group having an epoxy group or glycidyloxy group is exemplified by 3-glycidyloxypropyl and 2-(3,4-epoxycyclohexyl) groups. The epoxy groups in these epoxy-containing groups can be reacted with an amine compound such as ethylene diamine and dimethyl amine.

It is preferable, when good softness with sliminess is desired in the fabric material treated with the emulsion, that the groups denoted by $R^2$ have an unsubstituted or substituted amino group. On the other hand, softness with a dry touch can be imparted to the fabric material when the groups denoted by $R^2$ have an epoxy group. When these specific effects are to be obtained, the content of the groups $R^2$ in the organopolysiloxane should be in the range from 0.1 to 20% by moles of all of the organic groups therein. A too high content of the amino-containing groups is detrimental because of the possible decoloration or yellowing of the fabric material treated with the emulsion. A too high content of the epoxy-containing groups is detrimental because of the possible decrease in the stability of the emulsion, especially, when the emulsion is used in combination with other chemical agents. This is the reason for the limitation of the value of the subscript c in the formula (I) which should be in the range from 0.001 to 0.2.

The subscript a, which defines the content of the groups denoted by Q in the organopolysiloxane as the component (a), in the formula (I) should have a value of 0.001 to 0.2. The value should be larger than 0.001 in order to facilitate the one-step emulsification of the organopolysiloxane according to the inventive method. When the value of a is too large, on the other hand, the emulsion prepared from such an organopolysiloxane is less effective as a fabric-finishing agent in respect of the softness to be imparted to the fabric material treated with the emulsion.

Further, it is essential that the organopolysiloxane has a straightly linear molecular structure in order that the fabric material treated with the emulsion can be imparted with good softness although a small amount of branched structures has no particularly adverse influences. In this regard, the subscripts a, b and c in the average unit formula (I) must satisfy the relationship that the sum of $a+b+c$ is in the range from 1.8 to 2.1. The above described polyoxyalkylene groups denoted by Q can be bonded to the silicon atoms at any position of the molecular chain of the organopolysiloxane but they should preferably be bonded to the silicon atoms at the molecular chain ends of the organopolysiloxane rather than the silicon atoms at intermediate positions of the molecular chain.

The surface active agent as the emulsifying agent used in the preparation of the aqueous emulsion of an organopolysiloxane according to the inventive method is not particularly limitative including non-ionic surface active agents such as polyoxyethylene alkyl ethers, polyoxyethylene alkylphenyl ethers, sorbitan fatty acid esters, glycerin fatty acid esters and the like, anionic surface active agents such as sodium lauryl sulfate, sodium dodecylbenzene solfonate, sodium polyoxyethylene ether carboxylate and the like and cationic surface active agents such as quaternary ammonium salts and the like. In order to obtain a clear and stable aqueous microemulsion of the organopolysiloxane, it is preferable that at least 50% by weight of the total amount of the emulsifying agent is a non-ionic surface active agent or a combination of non-ionic surface active agents of which the overall HLB value is in the range from 9 to 14 as a weight-average although the above mentioned surface active agents can be used either singly or as a combination of two kinds or more according to need.

The amount of the emulsifying agent used in the preparation of the aqueous emulsion should be in the range from 5 to 100 parts by weight or, preferably, from 5 to 50 parts by weight per 100 parts by weight of the organopolysiloxane as the component (a). When the amount of the emulsifying agent is too small, the droplets of the organopolysiloxane would be coarse in diameter not to give a clear aqueous microemulsion while, when the amount of the emulsifying agent is too large, the aqueous emulsion of the organopolysiloxane could not impart fabric materials with good softness.

The amount of water used in the preparation of the aqueous emulsion of the organopolysiloxane should be sufficiently large to give an emulsion of the oil-in-water type but should be as small as possible in consideration of the productivity in the preparation of the emulsion and advantages in the storage and transportation of the product. In this regard, the amount of water as the component (c) should be in the range from 20 tp 2000 parts by weight or, preferably, from 100 to 500 parts by weight per 100 parts by weight of the organopolysiloxane as the component (a).

The aqueous emulsion of the organopolysiloxane can be prepared according to the inventive method without the troublesome step of phase inversion by merely mixing and agitating, by using a suitable stirrer such as homomixers, the above described organopolysiloxane, emulsifying agent and water introduced together into a vessel each in a specific amount or a mixture of the organopolysiloxane and emulsifying agent each in a specified amount introduced into a vessel followed by the addition of water also in a specified amount. By this means, an aqueous microemulsion of the organopolysiloxane of the oil-in-water type can be easily obtained and the diameter of the droplets of the organopolysiloxane can be as small as 0.3 μm or smaller to exhibit desirable performance as a fabric-finishing agent. The intensity and length of time of agitation of the mixture depend on the balance of the polarity between or the hydrophilicity of the organopolysiloxane and the emulsifying agent but most of commercially available agitating apparatuses are quite satisfactory for the purpose. The aqueous emulsion of the organopolysiloxane prepared according to the inventive method has excellent stability in storage and against dilution and mechanical shearing force.

In the treatment of a fabric material with the aqueous emulsion of the organopolysiloxane prepared according to the inventive method, the emulsion is diluted with water, usually, by 10 to 100 times by volume to give a treatment bath of an appropriate concentration with which the fabric material is soaked by a suitable method such as dipping, padding, spraying and the like followed by removal of the excessive volume of the liquid by using a mangle, centrifugal separator and the like to control the amount of the liquid picked up on the fabric material and drying with or without heating. When drying is performed by heating, the temperature is usually in the range from 100° to 180° C. and the time of heating is from 2 to 30 minutes. The amount of the fabric-finishing agent with which a fabric material is soaked is usually in the range from 0.1 to 5% by weight calculated for the organopolysiloxane as the component (a).

The aqueous emulsion of the organopolysiloxane prepared according to the inventive method can be used for the finishing treatment of fabric materials of unlimited kinds of fibers including not only natural fibers but also synthetic fibers. For example, excellent smoothness and softness as well as good feeling of touch can be imparted to the waddings of polyester fibers, acrylic fibers, nylon fibers, aramid fibers and the like and various kinds of woven cloths of natural fibers such as cotton, wool and the like by the treatment with the emulsion. The form of the fabric materials is also not limitative including filaments, rovings, threads, woven and non-woven fabrics, knit cloths and the like. Further, the emulsion can be applied to inorganic fibers such as glass fibers, carbon fibers and the like.

In the following, the method of the invention for the preparation of an aqueous emulsion of an organopolysiloxane is illustrated in more detail by way of examples and comparative examples, in which the term of "parts" always refers to "parts by weight".

EXAMPLE 1

A clear aqueous emulsion of the oil-in-water type was prepared by agitating a mixture composed of 100 parts of an organopolysiloxane expressed by the formula

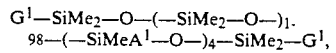

in which Me is a methyl group, $G^1$ is a polyoxyethylene group of the formula $MeO(C_2H_4O)_8C_3H_6-$ and $A^1$ is a 3-(N-2-aminoethyl)aminopropyl group of the formula $NH_2C_2H_4NHC_3H_6-$, 40 parts of a polyoxyethylene tridecyl ether having an HLB of 11.5 as a first emulsifying agent, 1 part of sodium polyoxyethylene nonylphenyl ether sulfate as a second emulsifying agent and 190 parts of water for 15 minutes at room temperature by using a homomixer driven at a velocity of 5000 rpm.

The droplets of the organopolysiloxane in the thus obtained emulsion had an average diameter of 0.016 μm as determined by using an instrument for the determination of particle size distribution (Coulter Counter Model N4, manufactured by Coulter Co.) and the emulsion was very stable in storage without showing no changes in appearance even after storage for 3 months at 25° C. The emulsion was also stable against dilution without causing changes when the emulsion diluted by 50 times or 500 times by volume with addition of water was kept standing for 24 hours at 25° C. Further, the emulsion after 50 times dilution with water was stable against mechanical shearing force showing absolutely no changes when the diluted emulsion was agitated for 10 minutes using a homomixer driven at a velocity of 5000 rpm followed by standing for 24 hours at 25° C.

EXAMPLE 2

A clear aqueous emulsion of the oil-in-water type was prepared by agitating a mixture composed of 100 parts of an organopolysiloxane expressed by the formula

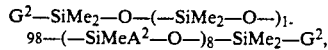

in which Me is a methyl group, $G^2$ is a polyoxyethylene group of the formula $MeO(C_2H_4O)_{15}C_3H_6-$ and $A^2$ is a 3-glycidyloxypropyl group of the formula $Ep-CH_2-O-C_3H_6-$, Ep being an epoxy group, 40 parts of a polyoxyethylene tridecyl ether having an HLB of 11.5 as a first emulsifying agent, 1 part of a sodium polyoxyethylene nonylphenyl ether sulfate as a second emulsifying agent and 190 parts of water for 15 minutes at room temperature by using a homomixer driven at a velocity of 5000 rpm.

The droplets of the organopolysiloxane in the thus obtained emulsion had an average diameter of 0.015 μm and the emulsion was found very stable in the tests for storage, dilution with water and mechanical shearing conducted in the same manner as in Example 1.

EXAMPLE 3

A clear aqueous emulsion of the oil-in-water type was prepared by agitating a mixture composed of 100 parts of an organopolysiloxane expressed by the formula

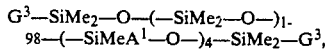

in which Me is a methyl group, $G^3$ is a polyoxyethylene group of the formula $MeO(C_2H_4O)_5C_3H_6-$ and $A^1$ has the same meaning as defined in Example 1, 24 parts of a polyoxyethylene nonylpheyl ether having an HLB of 8.9 as a first emulsifying agent, 16 parts of a polyoxyethylene lauryl ether having an HLB of 16.5 as a second emulsifying agent to given an overall HLB of 11.94, 1 part of a polyoxyethylene nonylphenyl ether sulfate as a third emulsifying agent and 190 parts of water for 15 minutes at room temperature by using a homomixer driven at a velocity of 5000 rpm.

The droplets of the organopolysiloxane in the thus obtained emulsion had an average diameter of 0.038 μm and the emulsion was found very stable in the tests for storage, dilution with water and mechanical shearing conducted in the same manner as in Example 1.

EXAMPLE 4

A clear aqueous emulsion of the oil-in-water type was prepared by agitating a mixture composed of 100 parts of an organopolysiloxane expressed by the formula

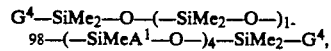

in which Me is a methyl group, $G^3$ is a poly(oxyethylene-oxypropylene) group of the formula $C_4H_9O(C_2H_4O)_{10}(C_3H_6O)_{10}C_3H_6-$ and $A^1$ has the same meaning as defined in Example 1, 20 parts of a polyoxyethylene tridecyl ether having an HLB of 11.5 as a first emulsifying agent, 1 part of a polyoxyethylene nonylphenyl ether sulfate as a second emulsifying agent and 190 parts of water for 15 minutes at room temperature by using a homomixer driven at a velocity of 5000 rpm.

The droplets of the organopolysiloxane in the thus obtained emulsion had an average diameter of 0.012 μm and the emulsion was found very stable in the tests for storage, dilution with water and mechanical shearing conducted in the same manner as in Example 1.

EXAMPLE 5

A clear aqueous emulsion of the oil-in-water type was prepared by agitating a mixture composed of 100 parts of an organopolysiloxane expressed by the formula

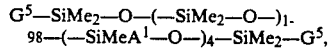

in which Me is a methyl group, $G^5$ is a polyoxyethylene group of the formula $MeO(C_2H_4O)_{35}C_3H_6-$ and $A^1$ has the same meaning as defined in Example 1, each the same amount of the first and second emulsifying agents as used in Example 1 and 195 parts of water for 15 minutes at room temperature by using a homomixer driven at a velocity of 7000 rpm.

The droplets of the organopolysiloxane in the thus obtained emulsion had an average diameter of 0.015 μm and the emulsion was found very stable in the tests for storage, dilution with water and mechanical shearing conducted in the same manner as in Example 1.

EXAMPLE 6

A clear aqueous emulsion of the oil-in-water type was prepared by agitating a mixture composed of 100 parts of the same organopolysiloxane as used in Example 5, 5 parts of a polyoxyethylene tridecyl ether having an HLB of 13.5 as the emulsifying agent and 228 parts of water for 15 minutes at room temperature by using a homomixer driven at a velocity of 7000 rpm.

The droplets of the organopolysiloxane in the thus obtained emulsion had an average diameter of 0.100 μm.

EXAMPLE 7

A clear aqueous emulsion of the oil-in-water type was prepared by agitating a mixture composed of 100 parts of an organopolysiloxane expressed by the formula

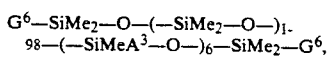
98—(—SiMeA³—O—)₆—SiMe₂—G⁶, in which Me is a methyl group, G⁶ is a polyoxyethylene group of the formula $HO(C_2H_4O)_{15}C_3H_6-$ and $A^3$ is a 3-aminopropyl group, 40 parts of a polyoxyethylene tridecyl ether having an HLB of 11.5 as the emulsifying agent and 190 parts of water for 15 minutes at room temperature by using a homomixer driven at a velocity of 5000 rpm.

The droplets of the organopolysiloxane is the thus obtained emulsion had an average diameter of 0.030 μm and the emulsion was found very stable in the tests for storage, dilution with water and mechanical shearing conducted in the same manner as in Example 1.

EXAMPLE 8

A clear aqueous emulsion of the oil-in-water type was prepared in just the same manner as in Example 7 excepting replacement of the organopolysiloxane with the same amount of another organopolysiloxane expressed by the formula

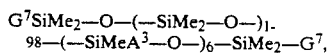
98—(—SiMeA³—O—)₆—SiMe₂—G⁷, in which Me is a methyl group, G⁷ is a polyoxyethylene group of the formula $MeCOO(C_2H_4O)_{15}C_3H_6-$ and $A^3$ is a 3-aminopropyl group.

The droplets of the organopolysiloxane in the thus obtained emulsion had an average diameter of 0.032 μm and the emulsion was found very stable in the tests for storage, dilution with water and mechanical shearing conducted in the same manner as in Example 1.

EXAMPLE 9

A clear aqueous emulsion of the oil-in-water type was prepared in just the same formulation as in Example 1 except that agitation of the mixture was performed by, instead of using a homomixer, shaking the mixture on a shaker for 30 minutes at a frequency of 200 times per minute.

The droplets of the organopolysiloxane in the thus obtained emulsion had an average diameter of 0.023 μm and the emulsion was found very stable in the tests for storage, dilution with water and mechanical shearing conducted in the same manner as in Example 1.

COMPARATIVE EXAMPLE 1

An attempt to prepare an aqueous emulstion of the oil-in-water type was performed in just the same manner as in Example 1 except that the organopolysiloxane was replaced with the same amount of another organopolysiloxane expressed by the formula

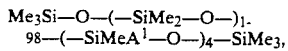
98—(—SiMeA¹—O—)₄—SiMe₃, in which Me is a methyl group and $A^1$ has the same meaning as defined in Example 1, for 15 minutes at room temperature by using a homomixer driven at a velocity of 5000 rpm. No stable aqueous emulsion could be obtained and phase separation took place in the once emulsified mixture shortly after the agitation was ceased.

COMPARATIVE EXAMPLE 2

A milky white aqueous emulsion of the oil-in-water type was prepared in just the same formulation as Example 1 except that the organopolysiloxane was replaced with the same amount of another organopolysiloxane expressed by the formula

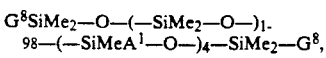
98—(—SiMeA¹—O—)₄—SiMe₂—G⁸, in which Me is a methyl group, G⁸ is a polyoxyethylene group of the formula $MeO(C_2H_4O)_2C_3H_6-$ and $A^1$ has the same meaning as defined in Example 1 and agitation of the mixture was performed for 20 minutes using a homomixer driven at a velocity of 7000 rpm.

When the emulsion diluted by 50 times with addition of water was agitated for 10 minutes using a homomixer driven at a velocity of 5000 rpm and then kept standing for 24 hours at 25° C., phase separation took place so that an oil film floating on the surface was found.

APPLICATION EXAMPLE

Each of the emulsions prepared in the above described Examples 1 to 4 was diluted by adding water to give a treatment bath which contained 0.3% by weight of the organopolysiloxane. A cotton broadcloth or a 65:35 mixed-spun broadcloth of polyester and cotton was dipped in the treatment bath and squeezed to give a 100% pick-up of the liquid followed by drying at 100° C. for 2 minutes and then heat treatment at 150° C. for 2 minutes.

The thus finished broadcloths were subjected to the evaluation of feeling by using a feeling tester (manufactured by Uenoyama Kiko Co.) to give the results shown in Table 1 below. The numerical value in g shown in the table gives the resistance of the cloth against bending as a measure of the softness. As is clear from comparison with the untreated cloths, all of these emulsions could remarkably improve the softness of the cloths as is indicated by the decrease in the numerical values.

TABLE 1

| Emulsion prepared in | Cotton cloth | Mixed-spun cloth |
| --- | --- | --- |
| Example 1 | 12.5 | 10.8 |
| Example 2 | 15.8 | 12.1 |
| Example 3 | 12.0 | 10.0 |
| Example 4 | 13.2 | 11.1 |
| Untreated | 20.2 | 16.6 |

What is claimed is:

1. A method for the preparation of an aqueous emulsion of an organopolysiloxane in which the droplets of the organopolysiloxane have an average particle diameter not exceeding 0.3 μm, which method comprises:
(A) mixing together
   (a) 100 parts by weight of an organopolysiloxane represented by the average unit formula

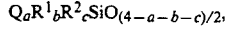

in which
   Q is a polyoxyalkylene group represented by the general formula

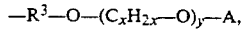

and is bonded to the silicon atom at the molecular chain end of the organopolysiloxane,
   A being a hydrogen atom, an acyl group or a monovalent hydrocarbon group, R³ being a divalent hydrocarbon group, the subscript x being 2, 3 or 4 and the subscript y being a positive integer of 3 to 100

R¹ is an unsubstituted or halogen-substituted monovalent hydrocarbon group having up to 20 carbon atoms or an alkoxy group having up to 20 carbon atoms, R² is a monovalent hydrocarbon group substituted with a substituent selected from the group consisting of an amino group; an alkyl- or aminoalkyl-substituted amino group; an amino group after reaction with an epoxy compound or an organic or inorganic acid; and a hydrocarbon group having an epoxy group or a glycidyloxy group unreacted or reacted with an amine compound, the subscript a is a positive number in the range of from 0.001 to 0.2, the subscript b is a positive number in the range of from 1.6 to 2.0, and the subscript c is a positive number in the range of from 0.001 to 0.2, with the proviso that a+b+c is in the range of from 1.8 to 2.1, (b) from 5 to 100 parts by weight of a surface active agent, and (c) from 20 to 2000 parts by weight of water; and (B) agitating the mixture of the components (a) and (b) and (c) to cause dispersion of the components (a) and (b) in the component (c).

2. The method for the preparation of an aqueous emulsion of an organopolysiloxane as claimed in claim 1 in which at least 50% by weight of the surface active agent as the component (b) is a non-ionic surface active agent.

3. The method for the preparation of an aqueous emulsion of an organopolysiloxane as claimed in claim 2 in which the HLB value of the non-ionic surface active agent is in the range from 9 to 14.

4. An aqueous emulsion of an organopolysiloxane which is an oil-in-water type dispersion of droplets having an average diameter not exceeding 0.3 μm consisting of:

(a) 100 parts by weight of an organopolysiloxane represented by the average unit formula

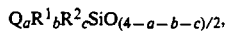

in which

Q is a polyoxyalkylene group represented by the general formula

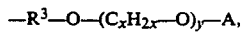

and is bonded to the silicon atom at the molecular chain and of the organopolysiloxane, A being a hydrogen atom, an acyl group or a monovalent hydrocarbon group, R³ being a divalent hydrocarbon group, x being 2, 3 or 4 and y being a positive integer of 3 to 100, R¹ is an unsubstituted or halogen-substituted monovalent hydrocarbon group having up to 20 carbon atoms or an alkoxy group having up to 20 carbon atoms, R² is a monovalent hydrocarbon group substituted with a substituent selected from the class consisting of an amino group, alkyl- or aminoalkyl-substituted amino group, amino group after reaction with an epoxy compound or an organic or inorganic acid and hydrocarbon group having an epoxy group or a glycidyloxy group unreacted or reacted with an amine compound, the subscript a is a positive number in the range of from 0.001 to 0.2, the subscript b is a positive number in the range of from 1.6 to 2.0, and the subscript c is a positive number in the range of from 0.001 to 0.2, with the proviso that a+b+c is in the range of from 1.8 to 2.1; and (b) from 5 to 100 parts by weight of a surface active agent in (c) from 20 to 2000 parts by weight of water.

5. An emulsion of claim 4, in which at least 50% by weight of the surface-active agent as the compound (b) is a non-ionic surface-active agent.

6. An emulsion of claim 5, in which the HLB value of the non-ionic surface active agent is in the range from 9 to 14.

* * * * *